United States Patent [19]

Rosenberg

[11] Patent Number: 5,037,548
[45] Date of Patent: Aug. 6, 1991

[54] MULTIPLE-DISC FILTER HAVING SMALLER PASSAGEWAYS ON THE OUTLET SIDE

[76] Inventor: Peretz Rosenberg, Moshav Beit Shearim, Israel

[21] Appl. No.: 112,966

[22] Filed: Oct. 27, 1987

[30] Foreign Application Priority Data

Nov. 14, 1986 [IL] Israel .................................. 80637

[51] Int. Cl.5 ...................... B01D 25/02; B01D 29/46
[52] U.S. Cl. ................................. 210/488; 210/492; 210/498
[58] Field of Search ............... 210/488, 352, 498, 492, 210/314, 440, 489

[56] References Cited

U.S. PATENT DOCUMENTS

| | | | |
|---|---|---|---|
| 3,005,556 | 10/1961 | Jensen | 210/488 |
| 4,549,963 | 10/1985 | Jensen et al. | 210/488 |
| 4,592,839 | 6/1986 | Rosenberg | 210/352 |
| 4,661,250 | 4/1987 | Rosenberg | 210/352 |
| 4,726,900 | 2/1988 | Keskinen et al. | 210/488 |

Primary Examiner—Steve Alvo
Attorney, Agent, or Firm—Benjamin J. Barish

[57] ABSTRACT

A multiple-disc filter body for separating solid particles from a fluid flowing through the filter body from its inlet side to its outlet side, comprises a stack of filter discs in which the side faces of each pair of adjacent discs are formed with ribs of at least two different heights such as to define filtering passageways of a larger size on the inlet side of the filter stack and filtering passageways of a smaller size on the outlet side of the filter stack in series with the larger-size filtering passageways, whereby coarse particles are first separated by the fluid in the larger size filtering passageways, and then finer particles are separated from the fluid in the smaller size filtering passageways.

12 Claims, 3 Drawing Sheets

MULTIPLE-DISC FILTER HAVING SMALLER PASSAGEWAYS ON THE OUTLET SIDE

BACKGROUND OF THE INVENTION

The present invention relates to multiple-disc filters, and particularly to the construction of the discs used in such filters.

Multiple-disc filters are gaining wide spread use in a large number of applications, for example in water irrigation systems for removing foreign particles which may clog the water irrigation devices. Such filters include a stack of filter discs in which the side faces of each pair of adjacent discs are formed with ribs defining filtering passageways between them. The present invention is particularly applicable to the multiple-disc filter construction illustrated in my U.S. Pat. Nos. 4,661,250 and 4,592,839, in which the ribs of one face of each pair of adjacent discs are of a first configuration, and the ribs on the other face of each pair of adjacent discs are of a second configuration and contact the first configuration ribs of the next adjacent disc such that the filter passageways between each pair of adjacent discs are of a size determined by the height of the second configuration ribs. In the preferred embodiment described in the above-cited U.S. Pat. No. 4,661,250, the first configuration ribs are of sinuous shape, and the second configuration ribs are of annular shape. It has been found that filters of such a construction have a low sensitivity to clogging by dirt particles, may be more effectively cleaned in a quick and simple manner, and have an increased dirt-removing and dirt-holding capacity, as compared to conventional multiple-disc filters.

BRIEF SUMMARY OF THE INVENTION

An object of the present invention is to provide a novel construction for a multiple-disc filter body which provides even further advantages, as will be described more particularly below. Another object of the invention is to provide a novel construction for a filter disc for use the novel multiple-disc filter body, and also a novel filter including the novel multiple-disc filter body.

The present invention provides a multiple-disc filter body for separating solid particles from a fluid flowing through the filter body from its inlet side to its outlet side, comprising a stack of filter discs in which the side faces of each pair of adjacent discs are formed with ribs defining filtering passageways between them, the ribs of one face of each pair of adjacent discs being of a first configuration, and the ribs of the other face of the pair of adjacent discs being of a second configuration and contacting the ribs of said one face such that the filtering passageways between the pair of adjacent discs are of a size determined by the height of said ribs of said other face of the disc.

According to the invention, the second configuration ribs on the other face include sections of at least two different heights such as to define filtering passageways of a larger size on the inlet side of the filter stack and filtering passageways of a smaller size on the outlet side of the filter stack in series with the larger-size filtering passageways, whereby coarse particles are first separated by the fluid in the larger size filtering passageways, and then finer particles are separated from the fluid in the smaller size filtering passageways.

Such a construction provides a number of advantanges which are quite important when the filter is used for removing dirt particles from liquids, but are particularly important when the filter is used for removing dirt particles from air or other gases. Thus, by providing filtering passageways of different sizes in series, such that the coarse particles are first removed and then the finer particles, a more efficient filtering action is produced with a smaller pressure drop across the filter; this is because the coarse particles are separated from the fluid before they can clog the fine passageways for the fine particles, which fine passageways determine the particle size removed by the filter. Moreover, the dirt-holding capacity of the filter is substantially increased since the dirt particles are separated and held in depth within the filter, rather than being concentrated along the inlet surface of the filter body as the case in most conventional filters of this type. Still further, a filter constructed in accordance with the foregoing features may be more effectively cleaned by back-flushing.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
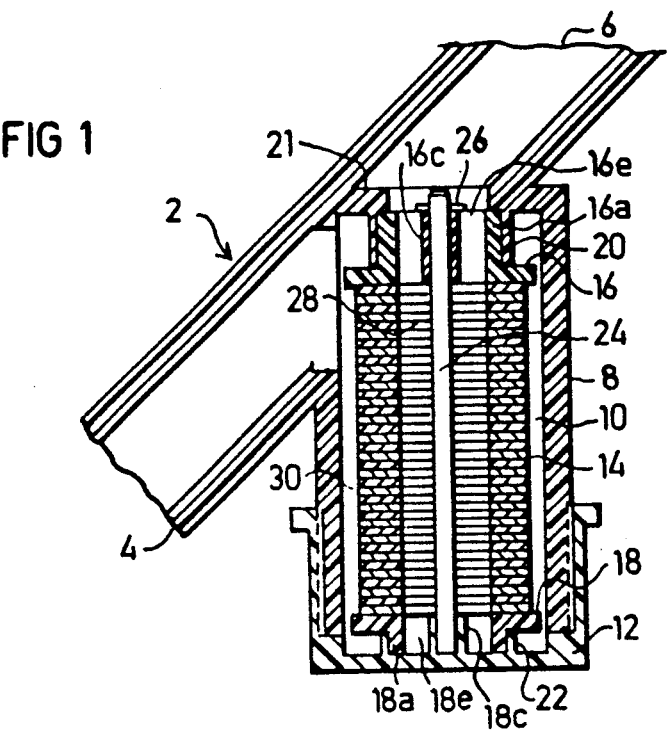
FIG. 1 is a longitudinal sectional view illustrating one form of multiple-disc filter constructed in accordance with the present invention.

The filter illustrated in FIG. 1 comprises a housing 2 having an inlet 4 connectable to the upstream fluid supply pipe, and an outlet 6 connectable to the downstream fluid supply pipe. Housing 2 further includes an intermediate cylindrical section 8 in which is disposed a filter body 10 which removes the solid particles from the fluid (e.g., air or other gas, or water or other liquid) as the fluid passes from the inlet 4 to the outlet 6. Cylindrical housing section 8 is closed at its bottom by a threaded cap 12.

Filter body 10 is constituted of a plurality of filter discs 14 secured between a pair of ends discs 16 and 18. End disc 16 is intergrally formed with a central tubular section 16a tapered at its outer tip to facilitate its reception within a sleeve 20 integrally formed in an apertured wall 21 in housing 2. End disc 18 is also integrally formed with a central tubular section 18a tapered at its outer tip to facilitate its reception within a cylindrical sleeve 22 integrally formed in end cap 12. Each of the end discs 16, 18 further includes a tubular sleeve 16c, 18c supported centrally of the respective disc by plurality of radial arms 16e, 18e. A reinforcement rod 24 extends axially through central sleeves 16c, 18c and the filter discs 14, and firmly secures the discs in a stack.

The fluid to be filtered is introduced via inlet 4 into an annular passageway 30, and flows through the spaces between the filter discs 14 of the filter body 10 into an inner passageway 28 and out through the spaces between the radial ribs 16e of the end disc 16 to the outlet 6. It will thus be seen that the outer edges of the filter discs 14 constitute the upstream side of the filter body receiving the unfiltered fluid, and the inner edges of the filter disc constitute the downstream side of the filter body through which the filtered fluid exits.

Figure 2:
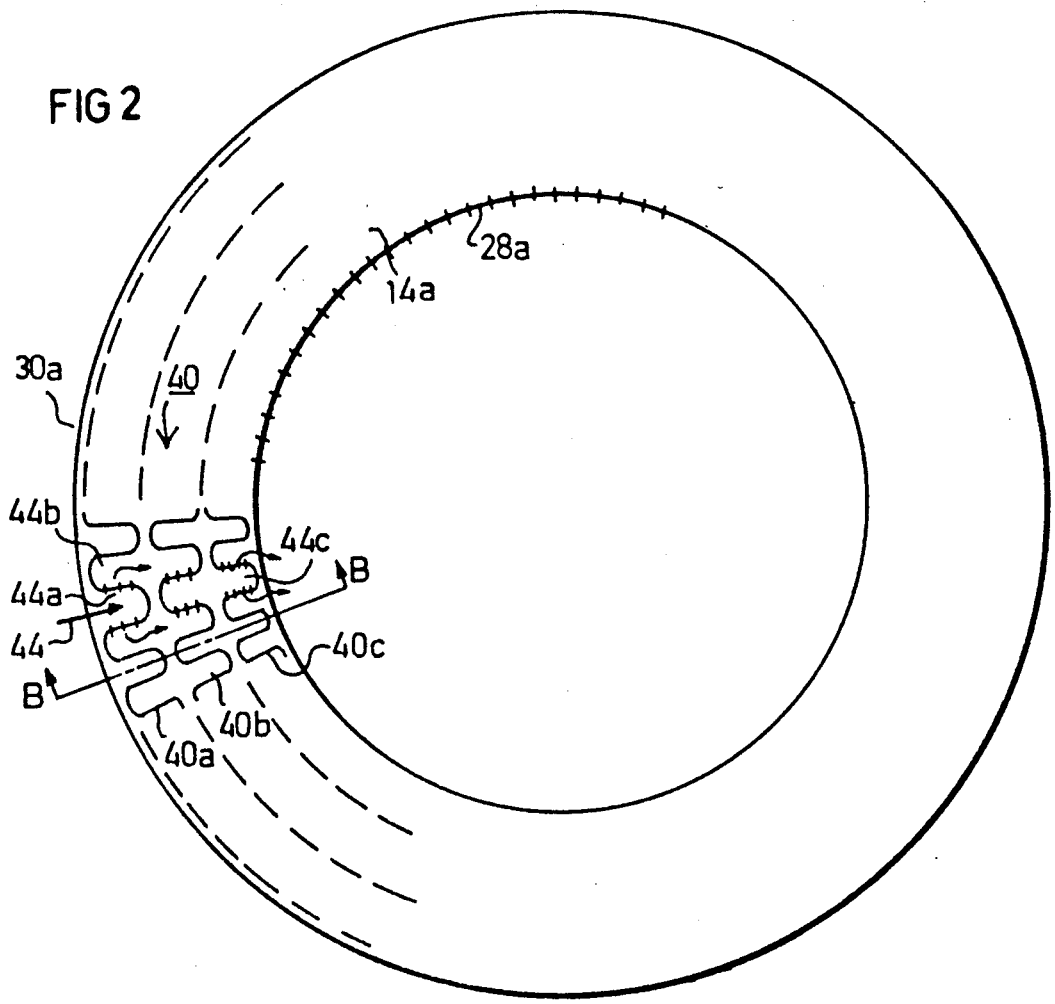
FIG. 2 illustrates the construction of one face of each filter disc in the filter of FIG. 1.

In the embodiment illustrated in FIG. 1, all the filter discs 14 are of identical construction, being of circular shape formed with a central opening defining the inner passageway 28. FIG. 2 illustrates one face 14a of each filter disc 14, and FIG. 3 illustrates the opposite face 14b of each filter disc.

Thus, as shown in FIG. 2, face 14a of each filter disc 14 is formed with three ribs 40 of sinuous configuration, each rib extending the complete circumference of the disc and radially spaced from the next adjacent rib and also 180° out of phase with the next adjacent rib. Thus, ribs 40 on face 14a of each filter disc includes a sinuous rib 40a adjacent to the outer edge 30a of the disc, an intermediate sinuous rib 40b, and an inner sinuous rib 40c adjacent to the inner edge 28a of the disc. It will also be seen that the intermediate rib 40b is 180° out of phase with respect to both end ribs 40a and 40c; thus, the valleys of rib 40b are aligned with the crests of ribs 40a, 40c, and the crests of rib 40b are aligned with the valleys of ribs 40a, 40c.

Figure 3:
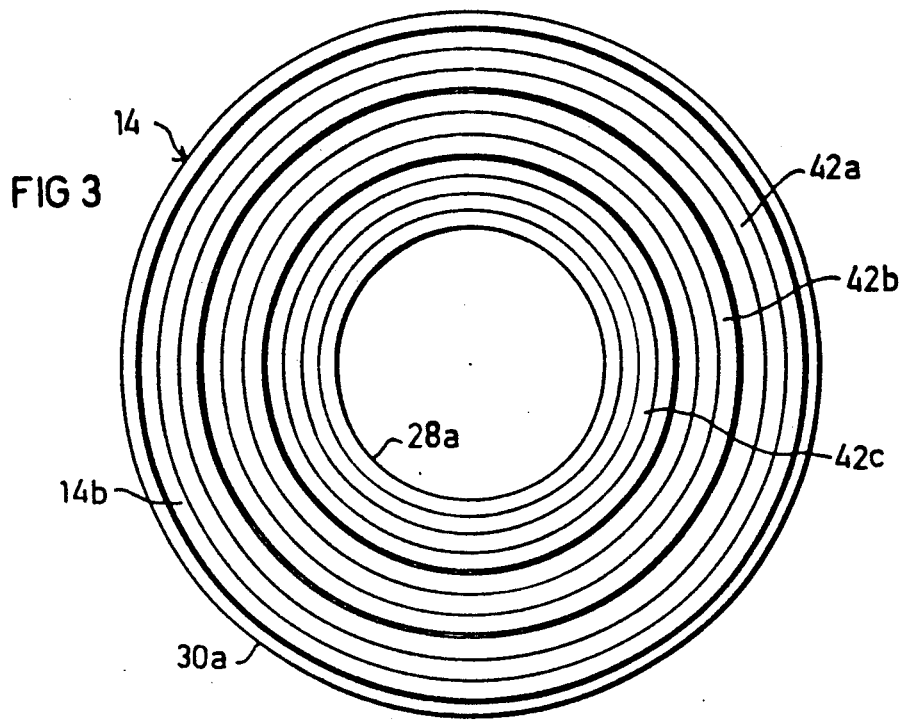
FIG. 3 illustrates the opposite face of each of the filter discs.
Figure 4:
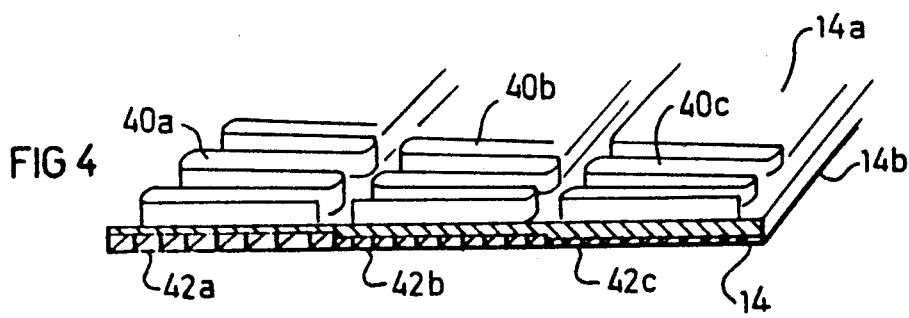
FIG. 4 is a fragmentary view more particularly illustrating the construction of the two faces of the disc of FIGS. 2 and 3.

As shown in FIG. 3, the opposite face 14b of each filter disc 14 is formed with a plurality of coaxial annular ribs radially spaced from each other. These ribs are divided into three groups, namely group 42a adjacent to the outer edge 30a of the disc, group 42b located inwardly of group 42a, and group 42c located adjacent to the inner edge 28a of the disc. As shown in FIG. 4, the three sinuous ribs 40a, 40b, 40c on face 14a are all of the same height. However, the annular ribs on face 14b are not of the same height. Rather group 42a adjacent to edge 30a is of the largest height; the intermediate group 42b is of smaller height; and the inner most group 42c adjacent to edge 28a is of the smallest height. The overall thickness of each disc, defined by the outermost edge of the sinuous ribs 40a–40c and the outermost edge of the annular ribs 42a–42c is uniform from the outer edge 30a to the inner edge 28a of the disc.

It will thus be seen that when a plurality of discs 14 are placed in a stack, the outermost edges of the annular ribs 42a–42c will contact the outermost edges of the radially-extending portions 44 of the sinuous ribs 40a–40c at substantially right angles to those ribs, to define filtering passageways between the respective faces of each pair of adjacent discs. The size of each filtering passageway will be determined by the height of the respective annular rib; the length of each filtering passageway will be determined by the spacing between the annular ribs; and the width of each filtering passageway will be determined by the thickness of the respective sinuous rib, particularly the radially-extending section thereof contacted by an annular rib 42a–42c. Since the three groups of annular ribs 42a, 42b, 42c are of decreasing height from the outer (upstream) edge 30a of the filter disc to the inner (downstream) edge 28a, the filtering passageways will be of decreasing size from the outer edge to the inner edge of the discs.

The path of the fluid flowing from the outer edge 30a to the inner edge 28a of the stack of filter discs 14 is shown by the arrows 44 in FIG. 2. It will be seen that the fluid first enters the space 44a between the crests of the outermost sinuous rib 40a; then flows through the filtering passageways defined by the sinuous rib 40a and annular ribs 42a into the space 44b between sinuous rib 40a and the next sinuous rib 40b; then through the filtering passageways defined by sinuous rib 40b and annular ribs 42b into the space 44c defined by sinuous rib 40b and sinuous rib 40c; then through the filtering passageways defined by sinuous rib 40c and annular ribs 42c, and finally into the inner chamber 28 communicating with the filter outlet 6.

It will also be seen that since the annular ribs 42a, 42b, 42c are of decreasing height, from the outer upstream edge 30a to the inner downstream edge 28a, the filtering passageways, which are connected in series in the above-described flow of the fluid, decrease in size from the upstream side 30a of the filter body to the downstream side 28a. Thus, the coarser particles are first separated from the fluid in the large size passageways defined by the largest, outermost annular ribs 42a, then finer particles are separated in the filtering passageways defined by the intermediate annular ribs 42b, and finally the finest particles are separated by the innermost annular ribs 42c.

Such a construction provides a number of important advantages as briefly indicated above. Thus, by first separating the coarser particles and lastly the finest particles, a more efficient separation of the particles is effected with a minimum pressure drop across the filter body. In addition, the described arrangement separates and holds the particles in depth within the filter body, thereby substantially increasing the dirt-removing and dirt-holding capacity of the filter body, as compared to more conventional filters where the particles are separated mostly at the upstream surface of the filter body. Further, the described arrangement permits more efficient cleaning of the filter by back-flushing since there is little tendency of particles becoming wedged within the filtering passageways.

Figure 5:
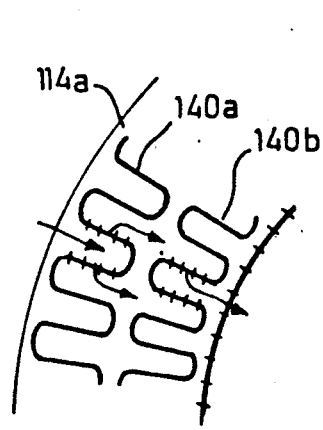
FIG. 5 is a fragmentary view illustrating a variation in the rib configuration of the disc face illustrated in FIG. 2.

FIG. 5 illustrates a variation in the construction of the face of the filtering disc including the sinuous ribs. Thus, as shown in FIG. 5, face 114a of each filter disc 114 is formed with only two sinuous ribs 140a, 140b; the opposite face (not shown) of each disc 114 would therefore be formed with only two groups of annular ribs (corresponding to ribs 42a–42c on face 14b in FIGS. 2–4), so that adjacent contacting discs would define only two different size passageways in series with each other in the flow of the fluid from the outer face to the inner face of the discs, as shown by the arrows in FIG. 5.

Figure 6:
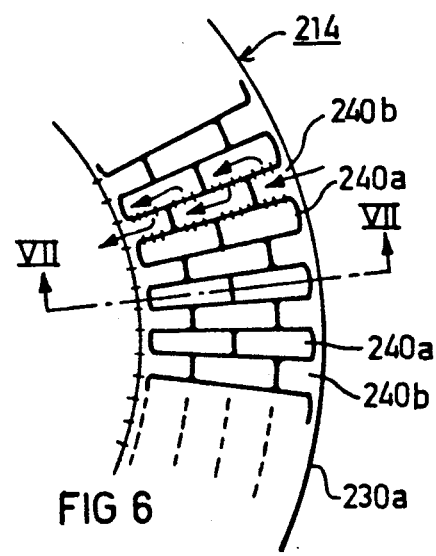
FIG. 6 is a fragmentary view illustrating another variation in the rib construction of the face illustrated in FIG. 2.
Figure 7:
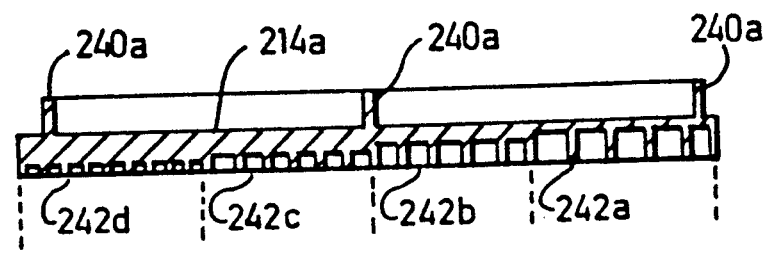
FIG. 7 is a sectional view along lines VII—VII of FIG. 6.
Figure 8:
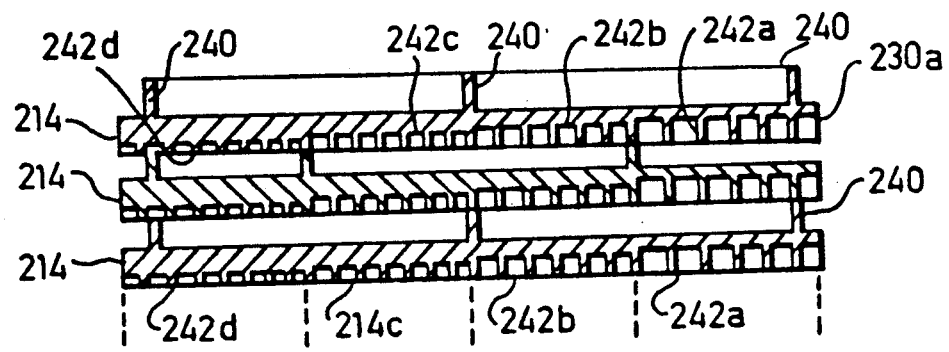
FIG. 8 illustrates a plurality of discs of the construction of FIGS. 6 and 7 arranged in a stack.

FIGS. 6–8 illustrate another construction of filter discs which may be used in order to produce filtering passageways of decreasing sizes in series with the flow of the fluid from the upstream side to the downstream side of the filter body. In this construction, the ribs formed on face 214a of the filter disc are constituted of a plurality of lines 240a of substantially rectangular ribs extending radially of the disc 214, alternating with a second plurality 240b of rectangular ribs also extending radially of the disc but in staggered relationship with respect to rectangualr ribs 240a. In addition, the rectangular ribs 240b are open at their opposite ends to define the inlet and outlet paths for the fluid flowing radially in the spaces between adajent discs, as shown by the arrows in FIG. 6.

In the construction illustrated in FIGS. 6-8, the annular ribs 242 formed on the opposite face 214b of the filter discs 214 are divided into 4 groups 242a, 242b, 242c, 242d, so as to define four sizes, rather than three sizes, of filtering passageways in series with each other in the flow path of the fluid, as shown by the arrows in FIG. 6. This is more clearly illustrated in FIG. 8 showing a plurality of (three) discs 214 arranged in a stack, wherein it will be seen that the flow passageways defined by annular ribs 242a adajacent to the outermost edges 230a of the stack are of largest dimensions and therefore separate the coarsest particles, and annular ribs 242d define the smallest filtering passageways and therefore separate the finest particles.

Figure 9:
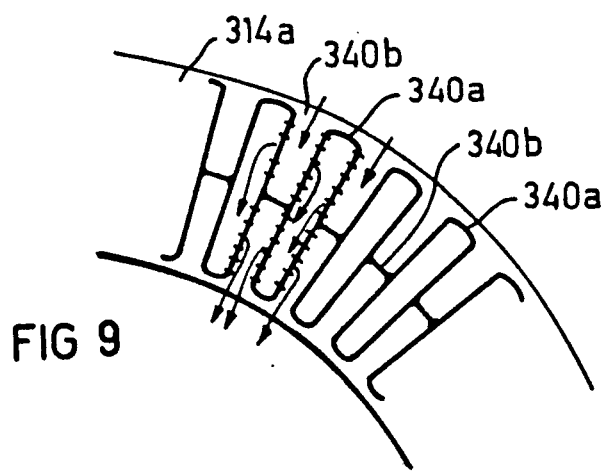
FIG. 9 is a fragmentary view illustrating a modification in the rib construction of FIG. 6.

FIG. 9 illustrates a variation in the rib construction of FIGS. 6-8. Thus, face 314a of each filter disc is formed with a plurality of substantially rectangular ribs 340a each separated by a space including a further rib 340b joining intermediate portions of ribs 340a. Such a construction is most similar to the sinuous rib contruction illustrated in FIG. 5, but in which the peak of the innermost sinuous rib joins the crest of the outermost sinuous rib. The construction in FIG. 9, like that in FIG. 5, would require only two groups of annular ribs on the opposite sides of the filter disc to define passageways of only two sizes in series in the path of the fluid flow through the stack of filter discs, as illustrated by the arrows in FIG. 9.

In all the above described embodiments, the filter discs are all of the same construction, namely each including the sinuous ribs (e.g., 40a-40c) on one face and the annular ribs (e.g., 42a-42c) on the opposite face.

Figure 10:
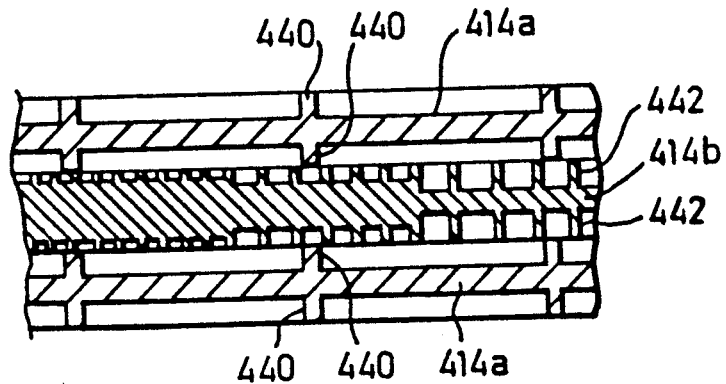
FIG. 10 illustrates a filter body constituted of two types of filter discs, one being formed with ribs of one configuration on both faces, and the other being formed with ribs of the other configuration on both faces.

FIG. 10 illustrates another arrangement wherein the stack is constituted of a plurality of discs 414a of one type including the ribs 440 of sinuous configuration on both its faces, alternating with a plurality of discs 414b of a second type including the annular ribs 442 on both its faces. Such an arrangement defines the same type of filtering passageways, and separates the solid particles from the fluid flowing through these passageways in the same manner as described above with respect to the other embodiments of the invention. An advantage of the arrangement of FIG. 10 is that the filter discs of the first type 414a may be the same for all size filters, the size of the filtering passageways in the filter being determined by the dimensions of the annular ribs in discs 414b. This arrangement thereby saves initial tooling and inventory costs in those cases where the filter discs are to be used with filters of many different sizes.

A further advantage in all the disclosed embodiments is that the spaces between the sinuous ribs or within the rectangular ribs may be filled with various materials (e.g., purifiers, deoderizers, filters etc.) in the form of particles having larger sizes than the filtering passageways defined by those ribs and the annular ribs.

While the invention has been described with respect to several preferred embodiments, it will be appreciated that many other variations, modifications and applications of the invention may be made.

What is claimed is:

1. A multiple-disc filter body for separating solid particles from a fluid flowing through the filter body from its inlet side to its outlet side, comprising: a stack of filter discs in which the side faces of each pair of adjacent discs are formed with ribs defining filtering passageways between them, the ribs of one face of each pair of adjacent discs being of a first configuration, and the ribs of the other face of the pair of adjacent discs being of a second configuration and contacting the ribs of said one face such that the filtering passageways between the pair of adjacent discs are of a size determined by the height of said ribs of said other face of the disc;

characterized in that the second configuration ribs on said other face include sections of at least two different heights such as to define filtering passageways of a larger size on the inlet side of the filter stack and filtering passageways of a smaller size on the outlet side of the filter stack in series with the larger-size filtering passageways, whereby coarse particles are first separated by the fluid in the larger size filtering passageways, and then finer particles are separated from the fluid in the smaller size filtering passageways;

said discs being of circular shape and being formed with a central opening; the first configuration ribs on said one face of each pair of adjacent discs including a sinuous rib for each different-height annular rib on said other face of each pair of adjacent discs and having portions extending radially of the disc; the second configuration ribs on said other face of the pair of adjacent discs being in the form of a plurality of annular, coaxial ribs contacting the radial portions of said first configuration ribs substantially at right angles; said annular ribs being of larger height on the inlet side of the respective disc face than the outlet side to define said filtering passageways of different sizes.

2. The filter body according to claim 1, wherein the second configuration ribs on said other face of each adjacent pair of discs include sections of at least three different heights such as to define filtering passageways of at least three different sizes in series, the filtering passageways decreasing in size from the inlet side to the outlet side of each pair of adjacent discs.

3. The filter body according to claim 1, wherein said one face of each pair of adjacent discs includes at least two sinuous ribs, one extending circumferencially adjacent to the outer edge of the disc face, and the other extending circuferencially adjacent to the inner edge of the disc face; and wherein said other face of each pair of adjacent disc is formed with a number of annular ribs corresponding to the number of sinuous ribs, including at least one extending adjacent to the outer edge of the disc face, and another extending adjacent to the inner edge of the disc face.

4. The filter body according to claim 3, wherein said one face of each pair of adjacent discs is formed with three sinuous ribs, each extending circumferencially and spaced radially from the next disc; and wherein said other face of each pair of adjacent discs is also formed with three radially-spaced annular ribs.

5. The filter body according to claim 1, wherein all said filter discs in the stack are of the same construction, each including ribs of said first configuration on one face, and ribs of said second configuration on the opposite face.

6. The filter body according to claim 1, wherein said stack of discs includes a first plurality of discs of one type including ribs of said first configuration on both its faces, alternating with a plurality of ribs of a second type including ribs of said second configuration on both its faces.

7. A filter disc for use in a multiple-disc filter body, said disc being of circular shape and being formed with a central opening, said disc being formed on one face with ribs of a first configuration, and being formed on its opposite face with ribs of a second configuration which, when a plurality of like discs are placed in a stack to form a multiple-disc filter body, contact the ribs of said first configuration of the next adjacent disc to define filtering passageways between the pair of adjacent discs of a size determined by the height of said ribs of said second configuration; characterized in that the second configuration ribs on said other face include sections of at least two different heights such as to define filtering passageways of a larger size on the inlet side of the filter stack and filtering passageways of a smaller size on the outlet side of the filter stack in series with the larger-size filtering passageways, whereby coarse particles are first separated by the fluid in the larger size filtering passageways, and then finer particles are separated from the fluid in the smaller-size filtering passageways; the first configuration ribs on said one face including, for each different-height annular rib on said other face, a sinuous rib having portions extending radially of the disc; the second configuration ribs on said other face being in the form of a plurality of annular, coaxial ribs disposed to contact the radial portions of said first configuration ribs of the next adjacent disc substantially at right angles; said annular ribs being of larger height on the inlet side of the respective disc face than at the outlet side to define said filtering passageways of different sizes with the next adjacent disc.

8. The filter disc according to claim 7, wherein said second configuration ribs on said other face of each adjacent pair of discs include sections of at least three different heights such as to define filtering passageways of at least three different sizes in series, the filtering passageways decreasing in size from the inlet side to the outlet side of each pair of adjacent discs.

9. The filter disc according to claim 7, wherein the first configuratin ribs on said one face include a first plurality of lines of rectangular ribs extending radially of the disc face, alternating with a second plurality of lines of rectangular ribs also extending radially of the disc face but in radially-staggered relation with respect to said first plurality of rectangular ribs; the end rectangular ribs in said second plurality of lines being open to define inlet and outlet paths for the fluid.

10. The filter disc according claim 7, wherein said second configuration ribs on said one face of adjacent discs include a plurality of radially-extending circumferencially-spaced ribs of closed rectangular configuration, and a plurality of circumferentially-extending ribs in the spaces between and joining adjacent rectangular ribs.

11. A multiple-disc filter body for separating solid particles from a fluid flowing through the filter body from its inlet side to its outlet side, comprising: a stack of filter discs in which the side faces of each pair of adjacent discs are formed with ribs defining filtering passageways between them, the ribs of one face of each pair of adjacent discs being of a first configuration, and the ribs of the other face of the pair of adjacent discs being of a second configuration and contacting the ribs of said one face such that the filtering passageways between the pair of adjacent discs are of a size determined by the height of said ribs of said other face of the disc;

said second configuration ribs on said other face including sections of at least two different heights such as to define filtering passageways of a larger size on the inlet side of the filter stack and filtering passageways of a smaller size on the outlet side of the filter stack in series with the larger-size filtering passageways, whereby coarse particles are first separated by the fluid in the larger size filtering passageways, and then finer particles are separated from the fluid in the smaller size filtering passageways;

said discs being of circular shape and being formed with a central opening; the first configuration ribs on said one face of each pair of adjacent discs including a first plurality of lines of substantially rectangular ribs extending radially of the disc face, alternating with a second plurality of lines of substantially rectangular ribs also extending radially of the disc face but in radially-staggered relation with respect to said first plurality of rectangular ribs; the end rectangular ribs in said second plurality of line being open to define inlet and outlet paths for the fluid; the second configuration ribs on said other face of the pair of adjacent discs being in the form of a plurality of annular, coaxial ribs contacting the radial portions of said first configuration ribs substantially at right angles; said annular ribs being of larger height on the inlet side of the respective disc face than the outlet side to define said filtering passageways of different sizes.

12. A multiple-disc filter body for separating solid particles from a fluid flowing through the filter body from its inlet side to its outlet side, comprising: a stack of filter discs in which the side faces of each pair of adjacent discs are formed with ribs defining filtering passageways between them, the ribs of one face of each pair of adjacent discs being of a first configuration, and the ribs of the other face of the pair of adjacent discs being of a second configuration and contacting the ribs of said one face such that the filtering passageways between the pair of adjacent discs are of a size determined by the height of said ribs of said other face of the disc;

said second configuration ribs on said other face including sections of at least two different heights such as to define filtering passageways of a larger size on the inlet side of the filter stack and filtering passageways of a smaller size on the outlet side of the filter stack in series with the larger-size filtering passageways, whereby coarse particles are first separated by the fluid in the larger size filtering passageways, and then finer particles are separated from the fluid in the smaller size filtering passageways;

said discs being of circular shape and being formed with a central opening; the first configuration ribs on said one face of adjacent discs including a plurality of radially-extending circumferentially-spaced ribs of closed substantially rectangular configuration, and a plurality of circumferentially-extending ribs in the spaces between and joining adjacent ones of said substantially rectangular ribs; the second configuration ribs on said other face of the pair of adjacent discs being in the form of a plurality of annular, coaxial ribs contacting the radial portions of said first configuration ribs substantially at right angles; said annular ribs being of larger height on the inlet side of the respective disc face than the outlet side to define said filtering passageways of different sizes.

* * * * *